United States Patent
Dehmann

(10) Patent No.: US 9,221,342 B2
(45) Date of Patent: Dec. 29, 2015

(54) METHOD AND DEVICE FOR DISPLAYING INFORMATION IN A VEHICLE

(75) Inventor: Rainer Dehmann, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 143 days.

(21) Appl. No.: 13/698,315

(22) PCT Filed: Mar. 31, 2011

(86) PCT No.: PCT/EP2011/001621
§ 371 (c)(1),
(2), (4) Date: Nov. 16, 2012

(87) PCT Pub. No.: WO2011/144274
PCT Pub. Date: Nov. 24, 2011

(65) Prior Publication Data
US 2013/0057400 A1    Mar. 7, 2013

(30) Foreign Application Priority Data
May 18, 2010  (DE) .................. 10 2010 020 894

(51) Int. Cl.
*B60Q 1/00* (2006.01)
*B60K 37/06* (2006.01)

(52) U.S. Cl.
CPC ........... *B60K 37/06* (2013.01); *B60K 2350/962* (2013.01)

(58) Field of Classification Search
CPC ...................................................... B60Q 1/503
USPC ........................................................ 340/441
See application file for complete search history.

(56) References Cited

U.S. PATENT DOCUMENTS

| 8,103,439 | B2* | 1/2012 | Onishi et al. .................. 701/410 |
| 8,321,127 | B2* | 11/2012 | Kon ...................... G01C 21/367 701/432 |
| 2003/0095182 | A1* | 5/2003 | Imoto .................... H04N 7/183 348/148 |
| 2004/0106438 | A1* | 6/2004 | Chen ................ H04M 1/72544 455/566 |
| 2005/0086611 | A1* | 4/2005 | Takabe .................. G06F 3/0482 715/823 |
| 2006/0213100 | A1* | 9/2006 | McCann ................. B60R 13/00 40/591 |
| 2008/0140277 | A1 | 6/2008 | Odinak et al. |
| 2008/0288166 | A1* | 11/2008 | Onishi ................... G01C 21/20 701/533 |
| 2008/0309475 | A1* | 12/2008 | Kuno .................... B60K 35/00 340/462 |

(Continued)

FOREIGN PATENT DOCUMENTS

| DE | 19754249 A1 | 6/1999 |
| DE | 19941955 A1 | 3/2001 |

(Continued)

OTHER PUBLICATIONS

Preliminary Report on Patentability for International Patent Application No. PCT/EP2011/001621; Nov. 20, 2012.

(Continued)

*Primary Examiner* — Hai Phan
*Assistant Examiner* — Zhen Y Wu
(74) *Attorney, Agent, or Firm* — Barnes & Thornburg LLP

(57) ABSTRACT

A method for displaying graphical objects. The graphical objects can be displayed by a control device of a display device in a first or second display mode. The speed of the vehicle is measured, and in a first speed range the graphical objects are displayed in the first display mode and in a second speed range the graphical objects are displayed in the second display mode. Also disclosed is a device for displaying information of graphical objects.

29 Claims, 10 Drawing Sheets

(56) References Cited

U.S. PATENT DOCUMENTS

| | | | | |
|---|---|---|---|---|
| 2009/0259958 | A1* | 10/2009 | Ban | G06F 3/0481 715/765 |
| 2011/0090074 | A1* | 4/2011 | Kuno et al. | B60K 35/00 340/438 |
| 2011/0106365 | A1* | 5/2011 | Miyake et al. | B60K 35/00 701/31.4 |
| 2011/0291822 | A1* | 12/2011 | Boston | B60Q 1/503 340/425.5 |

FOREIGN PATENT DOCUMENTS

| DE | 69613653 | T2 | 5/2002 |
|---|---|---|---|
| DE | 10346511 | A1 | 5/2005 |
| DE | 60106175 | T2 | 11/2005 |
| DE | 102005061505 | A1 | 7/2007 |
| DE | 102007039442 | A1 | 2/2009 |
| DE | 102007039445 | A1 | 2/2009 |
| EP | 0672892 | A1 | 4/1995 |
| EP | 1746560 | A1 | 1/2007 |
| WO | 2009046743 | A1 | 4/2009 |
| WO | 2009057070 | A2 | 5/2009 |

OTHER PUBLICATIONS

Search Report for German Patent Application No. 10 2010 020 894.9; Dec. 22, 2010.
Search Report for International Patent Application No. PCT/EP2011/001621; Jun. 29, 2011.
Office Action for Chinese Patent Application No. 201180035175.0; Apr. 20, 2015.

* cited by examiner

METHOD AND DEVICE FOR DISPLAYING INFORMATION IN A VEHICLE

PRIORITY CLAIM

This patent application is a U.S. National Phase of International Patent Application No. PCT/EP2011/001621, filed 31 Mar. 2011, which claims priority to German Patent Application No. 10 2010 020 894.9, filed 18 May 2010, the disclosures of which are incorporated herein by reference in their entirety.

FIELD

Disclosed embodiments relate to a method and an apparatus for displaying information in a vehicle, particularly a motor vehicle.

BACKGROUND

A motor vehicle contains various information and communication areas which have associated display instruments. These are used to inform the driver and passengers. In addition, they can assist the driver in navigation or in communication with the outside world. The display can visually present traffic-related or operation-related data, in particular, from the vehicle. Arranged in proximity to the primary field of vision of the driver is what is known as the combined instrument. Usually, this is in the cockpit behind the steering wheel, where it can be seen through an opening in the steering wheel. It is used particularly to display the speed, the tank content, the radiator temperature and other operation-related information from the motor vehicle. In addition, radio and audio functions can be presented. Finally, menus for telephone, navigation, telematics services and multimedia applications can be displayed. The display used is usually liquid-crystal displays in various disclosed embodiments.

As a further display device, a vehicle frequently has a multifunctional display in the central console or above the central console, which has an associated operator control element. Such a multifunctional operator control element is described in DE 199 41 955 A1, for example.

In order to present the many and diverse operator-control and display options clearly, hierarchic menu structures are frequently used. A menu displays various menu items and possibly graphics or icons associated with the menu items. When a menu item is selected, a submenu having further submenu items opens. This structure can be continued over a plurality of hierarchy levels. Furthermore, instead of a submenu, a menu item may have an associated particular display image which presents the information associated with the menu item.

Very specific demands on the structure of the display arise for the display of information in a motor vehicle. The reason is that the information needs to be displayed such that the information can also be assimilated easily and intuitively by the driver of the motor vehicle. In particular, the assimilation of information by the driver should not result in distraction while in transit.

DE 10 2007 039 442 A1 discloses a method for displaying information in a motor vehicle in which graphical objects are presented in an arrangement on a virtual ring presented in perspective and in which an input by a user prompts the graphics data to be altered such that the objects rotate on the virtual ring in the manner of a carousel.

This carousel-like presentation of graphical objects is advantageous particularly when a few graphical objects need to be presented simultaneously. However, if a larger number of graphical objects need to be presented simultaneously on a relatively small display panel, as is usual in motor vehicles, for example, then the problem arises that the individual objects are difficult for the driver to grasp while in transit in the motor vehicle.

SUMMARY

Disclosed embodiments provide a method and an apparatus of the type cited at the outset which allow the presented information to be grasped as quickly and intuitively as possible even when a larger number of graphical objects is displayed while the vehicle is in transit.

The method allows a plurality of graphical objects to be displayed by means of a control apparatus by a display device in a first or a second display mode. In addition, the speed of the vehicle is measured. Disclosed embodiments provide that in a first speed range the graphical objects are displayed in the first display mode and in a second speed range the graphical objects are displayed in the second display mode.

The method, therefore, allows the two display modes to be matched specifically to the situations in which they display the information. In this case, a display mode for a stationary vehicle or for a vehicle which is moving at low speed can be used to display the graphical objects. The other display mode can be used to display the graphical objects while the vehicle is in transit.

The speed ranges are, in particular, disjunct, i.e. they do not overlap. Optionally, the speed ranges adjoin one another. Exceeding or dropping below at least one limit value for the speed, therefore, prompts a change from one speed range to the other speed range, so that accordingly the display modes are also changed. This transition from one display mode to the other display mode may involve a hysteresis in order to prevent multiple switching to and fro between the display modes within short intervals of time when the speed of the vehicle is in the range of the limit value for the speed.

BRIEF DESCRIPTION OF THE DRAWINGS

Disclosed embodiments are explained below with reference to the drawings.

DETAILED DESCRIPTION

Figure 1:
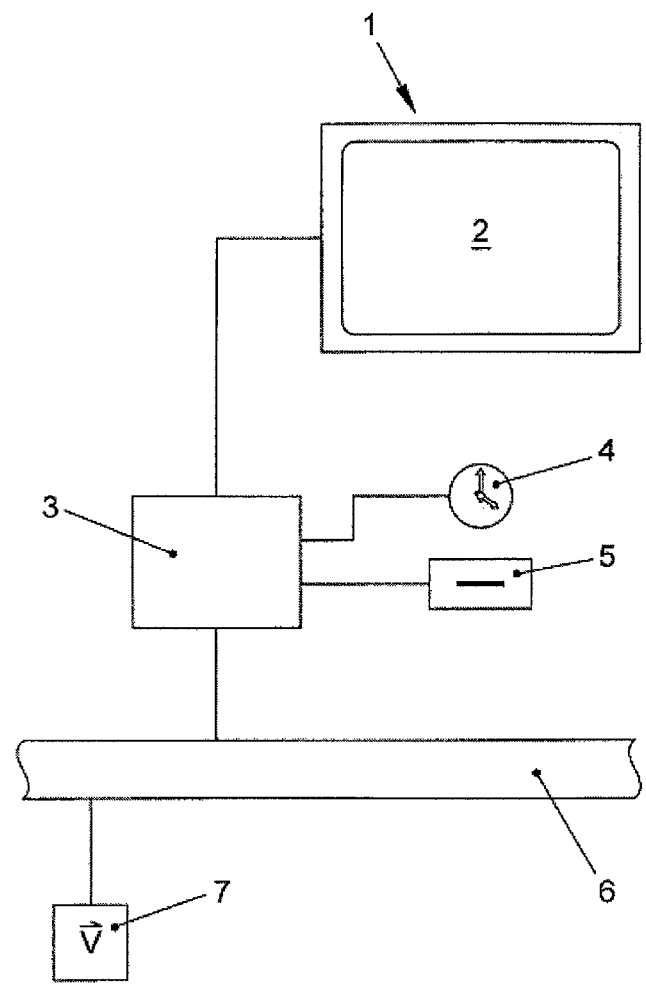
FIG. 1 schematically shows the design of a disclosed embodiment of the apparatus for displaying information.

According to at least one disclosed embodiment of the method, at least one limit value for the speed is in a range from 4 km/h to 20 km/h. If a hysteresis occurs, one of the two limit values for the hysteresis may be in this range or the mean value of the two limit values for the hysteresis is in this range. Optionally, the limit value for the speed is in a range from 5 km/h to 10 km/h, particularly in a range from 5 km/h to 8 km/h. Finally, the value of 6 km/h is optional for the limit value for the speed. It has been found that these values and ranges for the limit value for the speed are advantageous for changing over between the display modes when the method is used in a motor vehicle. In this way, it is particularly possible to achieve the effect that the driver is distracted as little as possible from driving the motor vehicle by the assimilation of information. The method, therefore, contributes towards safety when driving a vehicle.

According to at least one disclosed embodiment of the method, the two display modes differ only in terms of the layout of the presentation of the graphical objects, but not in terms of the content for the graphical objects. Although the graphical objects can be presented in another way in the two display modes, particularly the same number of graphical objects is presented in respective different arrangements.

The graphical objects are particularly part of a list having list elements, with the graphical objects being associated with the individual list elements in the list. They are, therefore, presented as representatives of the list elements by the display device. In the case of the disclosed method, all the graphical objects in the list are intended to be displayed simultaneously by the display device, in particular. The speed-dependent selection of the display mode, therefore, means that the method can achieve custom tailored matching of the layout to the speed of the vehicle, with the result that the information can always be assimilated by the driver in optimum fashion.

The number of graphical objects displayed in the display modes is particularly greater than eight. It has been found that when nine or more graphical objects are presented it becomes difficult to assimilate and distinguish the individual graphical objects in the case of particular types of presentation when the information needs to be assimilated by the driver while in transit at speeds above the aforementioned limit values.

According to at least one disclosed embodiment of the method, the transition from one to the other display mode prompts the control apparatus to actuate the display device such that the objects presented in one display mode move toward one another until they combine in a central area, and subsequently move away from one another in the direction of the positions of the presentation in the other display mode. In this case, particularly after the graphical objects have combined, a blank display can briefly be rendered, after which the graphical objects are then presented again. Hence, first contraction of the information content and then expansion of the information content are shown. This makes it possible to achieve uniform movement of the individual graphical objects which is, in particular, independent of whether a particular graphical object has been selected, and is independent of the type of presentation in the display modes.

According to another disclosed embodiment of the method, the movement of the graphical objects from the positions for presentation in one display mode toward one another in the direction of the central area is speeded up. In addition, the movement of the graphical objects subsequently away from one another in the direction of the positions for presentation in the other display mode is slowed down. The effect achieved by this is that the observer can grasp the transition between the display modes very easily and intuitively, which is advantageous particularly when the method is used in a motor vehicle. In addition, the magnitude of the speeding up and slowing down movement of the graphical objects may be dependent on the magnitude of the vehicle speed.

The first display mode involves the graphical objects being presented in an arrangement on a virtual ring presented in perspective, for example. In this case, selection of a graphical object can prompt the display to be altered such that the graphical objects rotate on the virtual ring in the manner of a carousel until the selected object is presented in the foreground of the ring presented in perspective, as described in detail in DE 10 2007 039 442 A1, for example.

Furthermore, the second display mode may involve the graphical objects being presented beside one another, for example, without overlap in a grid, wherein each graphical object has a fixed position in the grid irrespective of a selection of a graphical object.

For the transition between these two display modes, the control apparatus actuates the display device particularly such that the objects presented on the ring move toward one another until they combine in a central area. The graphical objects then move away from one another in the direction of the positions for presentation in the grid. Conversely, for the transition from the presentation in the grid, the graphical objects move toward one another until they combine in a central area. The graphical objects then move away from one another in the direction of their positions for presentation on the ring.

According to yet another disclosed embodiment of the method, at least one display mode involves the display of alphanumeric elements which are associated with at least some of the graphical objects. During the transition to the other display mode, these alphanumeric elements are hidden and are possibly shown again following the conclusion of the transition.

The apparatus for displaying information in a vehicle comprises a display device and a control apparatus for controlling the display device, wherein the control apparatus allows a plurality of graphical objects to be displayed by the display device in a first or a second display mode. In addition, a measuring apparatus for measuring the speed of the vehicle is provided which is coupled to the control apparatus. The control apparatus can be used to actuate the display device such that in a first speed range the objects are displayed in the first display mode and in a second speed range the objects are displayed in the second display mode.

The apparatus is designed particularly such that it can perform the method described above wholly or in part. The apparatus according, therefore, also has the same advantages as the aforementioned method.

A display device may be a display of arbitrary design which provides a display panel in the interior of the vehicle. Furthermore, the display device may be a display for the autostereoscopic reproduction of information in which the information is presented in three dimensions. Finally, the display device may be what is known as a head-up display or a head-down display, in which the display is projected on to a surface, for example on to the windshield of the vehicle.

The apparatus for displaying information comprises a display device 1 having a display panel 2. The display panel 2 can be provided by a display, particularly a liquid-crystal display, of arbitrary design. In addition, the display device 1 may be a projection device, such as a head-up or head-down display in a vehicle.

The display device 1 is coupled to a control apparatus 3 for the purpose of data interchange. The control apparatus 3 produces graphics data for presenting information on the display panel 2. The control apparatus 3 is able to produce not only static display images but also, in particular, animations, which visually display transitions between various display modes by virtue of movement of graphical objects. In addition, the animations may relate to movements by individual graphical objects in a particular display mode or to the movement of a graphical object from a first presentation in a display mode to a second presentation. In particular, the animations may be what are known as key image animations, in which the frames between two key images of an animation are produced in order to give the impression of a fluid alteration. The images produced between the key images are also called in-betweens and the production of the key image animation is called tweening. For the purpose of producing graphics data and for the purpose of performing the animations, the control apparatus 3 is coupled to a memory 5 and to a system clock 4 for the purpose of data interchange.

Furthermore, an input device is provided. In particular, the input device may comprise a touch-sensitive surface which is provided separately from the display panel 2, with the result that what is known as a touch pad is formed, or which is provided on the display panel 2, with the result that what is known as a touchscreen is provided. Furthermore, the input device, which comprises the touchpad or the touchscreen, may comprise an approach sensing apparatus which senses the approach of an operating element, such as particularly the fingertip of a user, to the touch-sensitive surface. The approach of such an operating element to the touch-sensitive surface can be taken as a basis for altering the information displayed.

Furthermore, the input device may be an inherently known device for sensing and evaluating a gesture by a body part of a user. By way of example, the hand of a user can perform a gesture in front of the display panel 2. The three-dimensional position of the hand in a particular locale in front of the display panel 2 is sensed and is interpreted as an input. In this case, it is not necessary for the user to touch the display panel 2.

Finally, the input device used may be a remote operator control element, particularly a mechanical operator control element. The mechanical operator control element may be a rotary controller or an inherently known rotary push controller. This operator control element can be used to actuate, alter and select graphical objects which are displayed on the display panel 2.

In addition, the control apparatus 3 is connected to further devices which transmit data for the display on the display panel 2 to the control apparatus 3. In the disclosed embodiment shown in FIG. 1, the apparatus is used in a vehicle, particularly a motor vehicle. In this case, the control apparatus 3 is connected to a data bus 6 in the vehicle. The data bus 6 is in turn coupled to many and diverse devices in the vehicle, particularly to a measuring apparatus 7 for measuring the speed of the vehicle. The current vehicle speed can, therefore, be transmitted to the control apparatus 3 by the measuring apparatus 7 via the data bus 6.

The text below explains a disclosed embodiment of the method, which can be performed by the apparatus described with reference to FIG. 1. In this case, the apparatus or the method is used in a vehicle.

Figure 2:
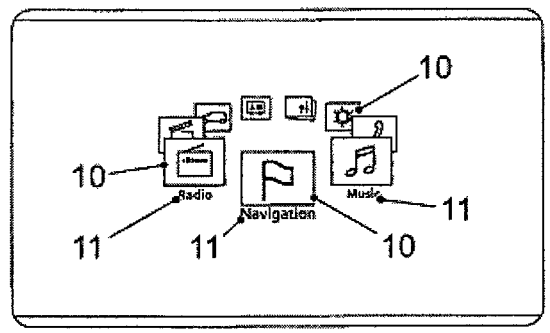
FIGS. 2-9 show presentations on a display panel which are produced by a disclosed embodiment of the method in line.

In the case of the method, the information is displayed in a hierarchic structure. The starting point for this hierarchic structure is the reproduction on the display panel 2 that is shown in FIG. 2. A plurality of graphical objects 10 are presented in an arrangement on a virtual ring presented in perspective. The perspective presentation shows the virtual ring as though the observer is looking onto the ring obliquely from above. In this case, a graphical object 10 in the foreground is presented largest in the perspective presentation. Toward the rear, further graphical objects 10 are presented, with partial concealment by objects 10 situated in front of them. Overall, nine or more graphical objects 10 are displayed in the disclosed embodiment.

The graphical objects 10 are in the form of buttons, so that they can be marked or selected by the user by means of the input device. Within the context of the invention, a button is understood to mean a control element for a graphical user interface. A button differs from elements and panels for the pure display of information, what are known as display elements and display panels, in that they are selectable. When a button is selected, a function associated therewith is performed. The function can merely result in the information display being altered. In addition, the buttons can also be used to control devices for which the operator control is assisted by the information display. The buttons can, therefore, replace conventional mechanical switches. The buttons can be produced and displayed arbitrarily on a user-programmable display panel 2. Furthermore, provision may be made for a button to be able to be marked. In this case, the associated function is not yet performed. The marked button is presented in highlight in comparison with other buttons, however. A button can be marked and/or selected by means of cursor control or by virtue of direct operator control of a touch-sensitive display panel.

The graphical objects 10 comprise symbols which provide the user with advice of the function of the object. In addition, at least some graphical objects 10 may have labels 11 which explain the function again alphanumerically. When the objects 10 are presented on the ring shown in perspective, labels 11 for the objects 10 presented in the foreground are rendered, in particular.

Figure 3:
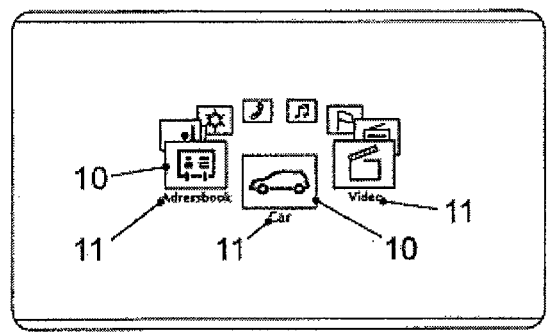

The user can use the input device to rotate the objects 10 on the ring presented in perspective in the manner of a carousel. By way of example, the user can use the input device to bring arbitrary graphical objects 10 into the foreground and to select them. By way of example, FIG. 2 shows a graphical object 10 in the foreground that is associated with the navigation system of a vehicle, and FIG. 3 shows a graphical object 10 in the foreground that is associated with various displays of operating parameters for the vehicle. Details regarding the display and control of the graphical objects 10 in the display mode which is shown in FIGS. 2 and 3 are described in DE 10 2007 039 442 A1.

In the disclosed embodiments of the method, the graphical objects 10 are not only able to be presented in the first display mode shown in FIGS. 2 and 3, however. A second display mode is defined, in which the same graphical objects 10 are displayed in another way, i.e. in another layout. The reason is that it has been found that the display on the ring presented in perspective in the first display mode is difficult for the driver to grasp and operate while in transit in the vehicle when more than eight graphical objects 10 are presented. For this reason, the method involves the display mode being selected automatically on the basis of the vehicle speed. If the vehicle is moving in a first speed range, the graphical objects 10 are displayed in the first display mode. If the vehicle is moving in another, second speed range, the graphical objects 10 are presented in the second display mode, described later. The two speed ranges adjoin one another, with a limit speed being defined. If a vehicle exceeds or drops below this limit speed, there is automatically a change from one display mode to the other display mode. By way of example, the limit speed is in a range from 4 km/h to 20 km/h, particularly in a range from 5 km/h to 10 km/h and optionally in a range from 5 km/h to 8 km/h. In the disclosed embodiment described here, a limit value for the speed of 6 km/h has been chosen.

The transition from one display mode to the other display mode may also involve a hysteresis, which may be in a range from 2 km/h to 5 km/h, for example. If a hysteresis of 2 km/h is defined for a limit speed of 6 km/h, for example, then the display mode changes when the vehicle speed exceeds 8 km/h. When the speed is then reduced again, the display mode does not change again until the speed has dropped below 4 km/h, however. When the vehicle speed then rises again, the display mode is again changed only at a speed of 8 km/h.

Hence, two limit speeds above and below the average limit speed are defined for the hysteresis.

The vehicle speed is transmitted continually from the measuring apparatus 7 to the control apparatus 3. When the vehicle exceeds or drops below the limit value for the vehicle speed, the control apparatus 3 produces an animation for the transition from one display mode to the other display mode. The display on the display panel 2, therefore, does not alter abruptly, but rather in a fluent transition, so that the user retains his orientation in the hierarchic display structure.

The text below makes reference to FIGS. 3 to 9 to explain the transition from the first display mode shown in FIG. 3 to the second display mode shown in FIG. 9:

The display shown in FIG. 3 is reproduced on the display panel 2 in the vehicle when stationary. The driver now sets the vehicle in motion and exceeds the limit speed for the transition from the first display mode to the second display mode. This exceeding of the limit speed is sensed by the control apparatus 3 on the basis of the data from the measuring apparatus 7. The control apparatus 3 then produces an animation, i.e. a movement by the graphical objects 10, as shown in FIGS. 4 to 9.

Figure 4:
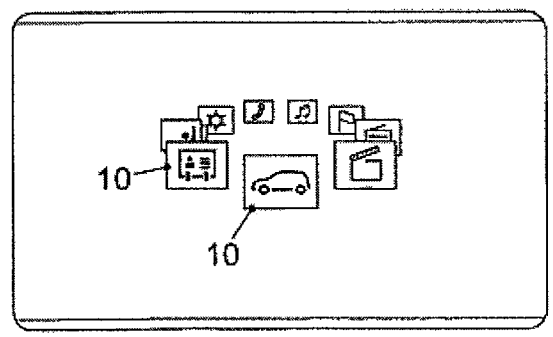
Figure 5:
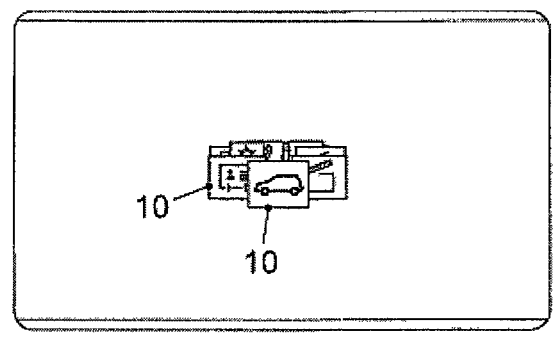
Figure 6:
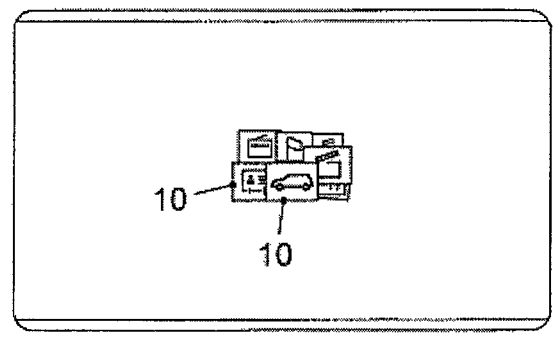
Figure 7:
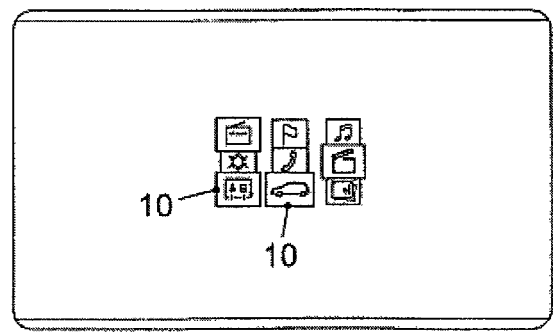
Figure 8:
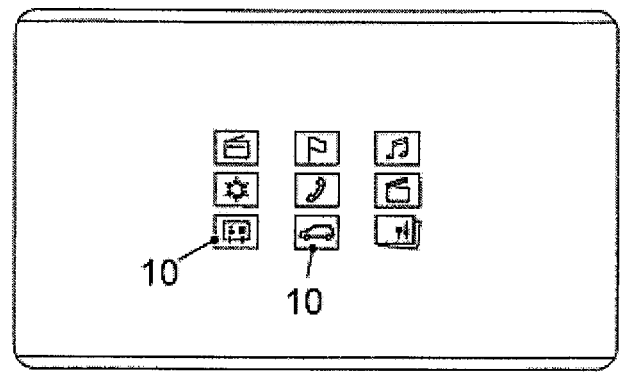

First of all, the labels 11 of the three graphical elements 10 shown in the foreground (FIG. 4) disappear. The graphical objects 10 then move toward one another, as shown in FIGS. 4 and 5, until they combine in a central area of the display panel 2. At the end of this combination, a blank display can possibly be briefly rendered on the display panel 2. The graphical objects 10 are then presented again. They now move away from one another in the direction of the positions for presentation in the second display mode. The expansion of the graphical objects 10 is shown in FIGS. 6 to 9. In this context, FIG. 9 shows the final state of the display in the second display mode.

In the second display mode, the graphical objects 10 are presented beside one another, without overlap in a grid. In this case, each graphical object has an associated fixed position in the grid irrespective of the selection of one of the graphical objects. When the movement of the graphical objects 10 to the grid presentation has ended, labels 11 are finally displayed for all the graphical objects 10.

In the second display mode, the driver of the vehicle can very quickly grasp all the graphical objects 10. In order to select a particular object 10, very little attentiveness is, therefore, demanded of the driver, which means that he is not distracted from what is happening in his driving by the selection of a graphical object 10. Fast and intuitive assimilation of the information as presented in the second display mode is assisted by virtue of all the graphical objects 10 being presented without overlap in the same size. In addition, the user can very easily orient himself in the grid presentation, since the various graphical objects 10 have a fixed place in the grid, which the user can remember after repeated use.

When the vehicle subsequently drops below the limit speed again, possibly taking account of the hysteresis, the control apparatus 3 produces a reverse animation from the second display mode to the first display mode. This involves the graphical objects 10 being moved toward one another from the grid presentation shown in FIG. 9 until they combine in the central area, and then being expanded again in the direction of the positions on the ring as shown in FIG. 2 or 3. In the case of this reverse animation too, the labels 10 are hidden and are shown again in the final state. If an object 10 was marked in the grid presentation, this object 10 is presented in the foreground in the presentation on the ring in the first display mode.

With reference to FIGS. 9 to 12, a further aspect of the method is explained which can also be performed by the apparatus described with reference to FIG. 1. In this case, the use of the apparatus or of the method is not limited to a vehicle. The apparatus and the method can be used in arbitrary appliances, particularly in portable appliances, such as a music player, a mobile telephone or a mobile navigation system. It goes without saying that use in a vehicle is also possible.

Figure 9:
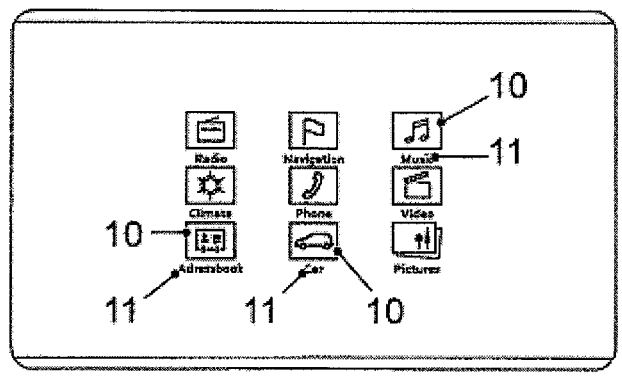
Figure 10:
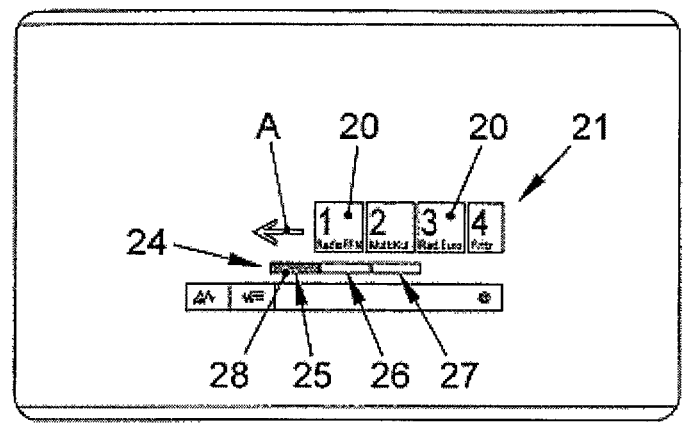
FIGS. 10-24 show presentations on a display panel which are produced by second and third disclosed embodiments of the method.
Figure 11:
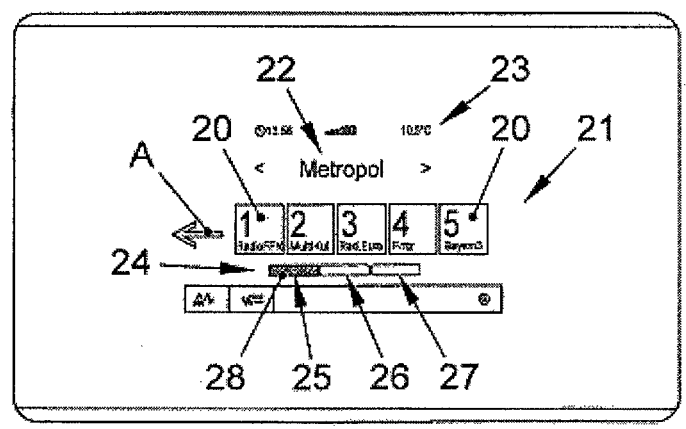

Another disclosed embodiment of the method relates to the transition from a first presentation on the display panel 2 to a second presentation on the display panel 2. The first presentation may be the display in the first or the second display mode, as shown in FIGS. 2, 3 and 9. By way of example, the second presentation relates to the context of a graphical object 10. The second presentation is displayed by a user by means of the input device particularly after selection of a graphical object 10. In this case, another information content and not just an altered layout is, therefore, displayed. In this case too, an abrupt change of the display on the display panel 2 is not brought about, however, but rather a fluent transition from the first presentation to the second presentation, as explained below:

If, on the basis of the display as shown in FIG. 9, for example, the user selects the graphical object 10 with the label "radio", the control apparatus 3 produces an animation in which the graphical objects 10 are moved outward away from one another. Briefly, a blank display is reproduced on the display panel 2. Various other graphical objects 20 from the second presentation on the display panel 2 are then moved toward their final position. An important feature of at least one disclosed embodiment of the method is the movement of the newly displayed graphical objects 20, particularly the movement of a main object which serves as an eye catcher for the user during this transition.

Figure 12:
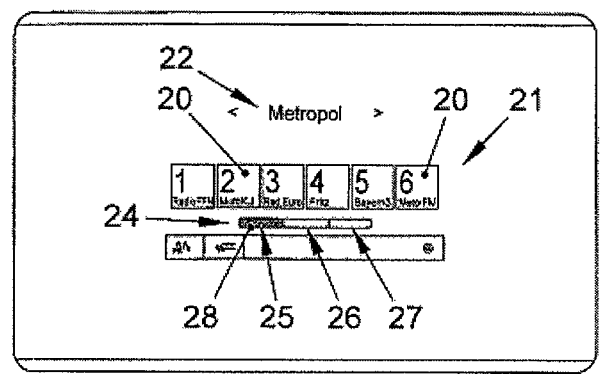
Figure 13:
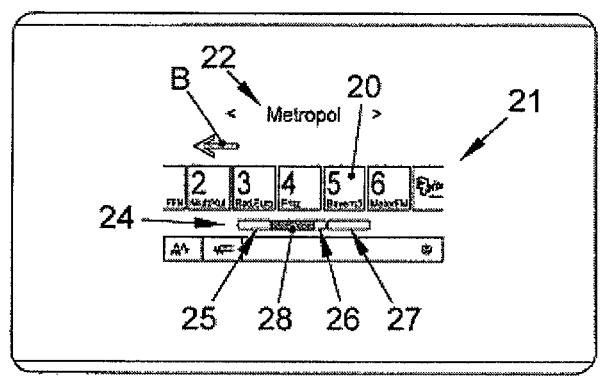
Figure 14:
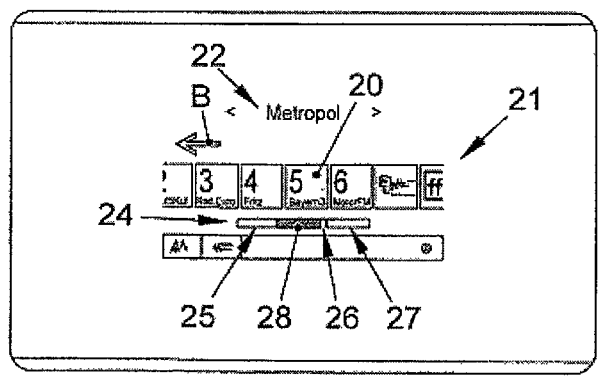
Figure 15:
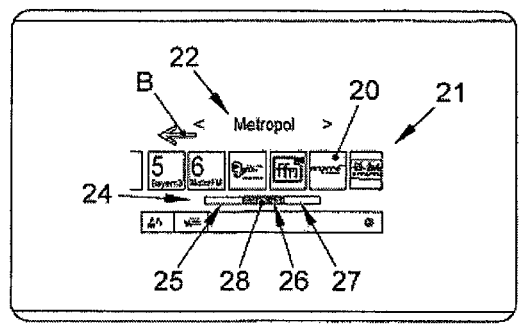
Figure 16:
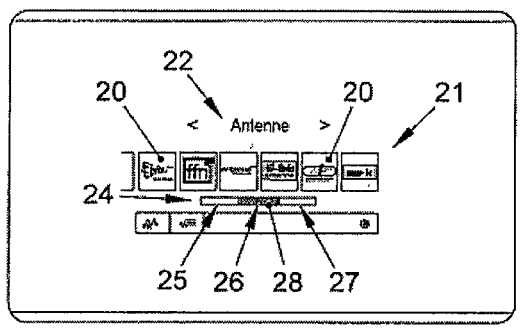
Figure 17:
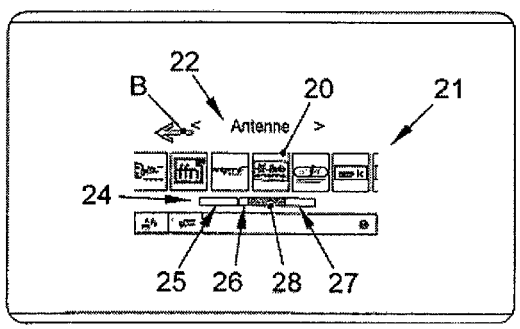
Figure 18:
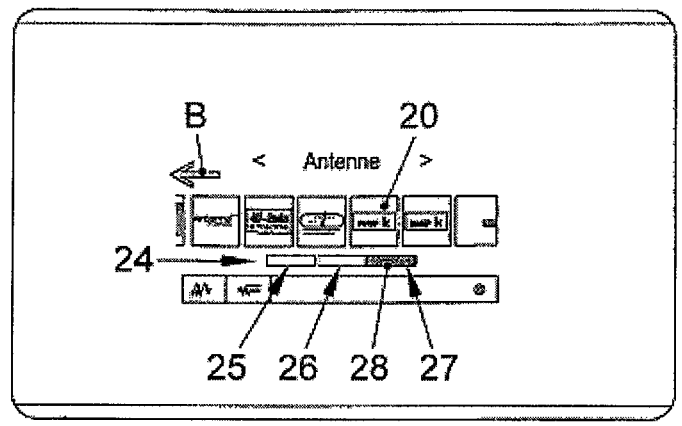
Figure 19:
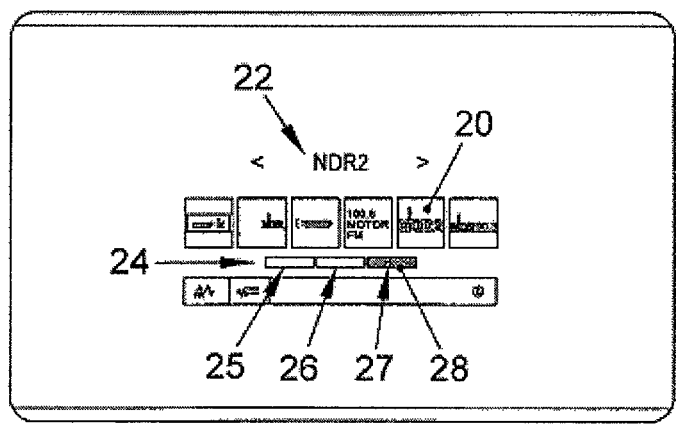

In the transition described in this disclosed embodiment, a strip 21 is moved into the display panel 2 for the radio function. This strip 21 contains a plurality of graphical objects 20 which represent individual radio stations. The strip 21 is moved in a particular movement pattern for this transition on the display panel 2. In the disclosed embodiment described here, the strip 21 with the graphical objects 20 is moved from right to left in the direction of arrow A. There then appear ever more graphical objects 20 until in the final state, as shown in FIG. 12, a total of six graphical objects 20 are presented on the strip 21. Furthermore, further display elements or buttons 22, 23 and 24 are shown as the strip 21 moves.

The movement pattern which the strip 21 performs is distinguished in that it corresponds to a movement pattern which is performed in the second presentation when one of the graphical objects 20 is operated for an input using the input device in the second presentation.

By way of example, the user can, in order to display further graphical objects 20 for other radio stations, move the graphical objects 20 on the strip 21. In this case, the graphical objects 20 are also moved in the direction of arrow A or in the opposite direction. For the transition from the first presentation to the second presentation, the movement of the strip 21 with the graphical objects 20, therefore, already conveys to the observer how the graphical objects 20 can be moved in the second presentation. The type of transition is, therefore, simultaneously used as an instruction manual for operating graphical objects 20 in a list in the second type of presentation.

As shown in FIGS. 13 to 19, the reason is that the user can move the graphical objects 20, for example with a swiping gesture, in the direction of arrow B in order to displace the graphical objects 20 to the left and to display other graphical elements 20 for other radio stations. In the present case, the list with the radio stations contains a total of eighteen list entries, each of which has an associated graphical object 20. By means of a swiping gesture in the direction of arrow B or in the opposite direction, the user can alter the display of the list entries as appropriate. The movement pattern of this movement in the direction of arrow B or in the opposite direction then corresponds to the movement pattern in the direction of arrow A for the transition to the presentation of the graphical objects 20 for the radio stations. If the list entries are altered in another movement pattern, for example in a swivel or rotary movement, the transition to the second type of presentation with the radio stations would also take place such that the list with the graphical objects 20 is moved in on the display panel 2 in a swivel or rotary movement.

Finally, with reference to FIGS. 12 to 24, another disclosed embodiment of the method is explained which can also be performed by the apparatus described with reference to FIG. 1. This third aspect is also independent of use in the vehicle. In particular, it can also be used in portable appliances.

As explained above, a total of eighteen graphical objects 20 which represent various radio stations can be presented on the display panel 2. However, the display panel 2 is not large enough to present all eighteen objects 20 simultaneously. Therefore, the display panel 2 always displays only a genuine subset of the total set of graphical objects 20. The displayed subset can be altered by an operator control process which is performed by means of the input device. This disclosed embodiment of the method relates to a method for providing a user interface in which the displayed subset of the objects 20 can be altered and the user is provided with a visual display of which subset within the total set is currently displayed.

When a display panel 2 displays only a subset from a set having a multiplicity of objects, what is known as a scrollbar is conventionally displayed to the observer as a graphical element. Such a scrollbar comprises two graphical subelements: firstly a strip is displayed, the length of which represents the magnitude of the total set, and secondly a marker on the strip is displayed, the length of which represents the magnitude of the displayed subset and the position of which relative to the strip provides the observer with a visual display of where the displayed subset is situated within the total set. In this case, the displayed set is, therefore, particularly subject to a particular order.

In a further disclosed embodiment, the user interface and the type of visual display are modified as follows:

The graphical objects 20 are divided into n disjunct subsets. In this case, n is a natural number which is greater than 2. In the disclosed embodiment described here, the total set of graphical objects 20 comprises a total of eighteen objects 20. This total set is divided into three disjunct subsets: The first subset comprises the graphical objects 20 Nos. 1 to 6, the second subset comprises the graphical objects 20 Nos. 7 to 12 and the third subset comprises the graphical objects 20 Nos. 13 to 18.

As FIG. 12 shows, a graphical element which is divided into two subelements is situated beneath the display of the graphical objects 20 for the radio stations. The first graphical subelement is a modified strip 24. The strip 24 is in turn divided into a total of n segments which are arranged at intervals from one another. In the present case, the three segments 25, 26 and 27 are, therefore, displayed.

Furthermore, the second graphical subelement displayed is a marker 28. If no operator control process for altering the subset of graphical objects 20 that is to be displayed is being performed, the marker 28 is always displayed congruently with one of the segments 25, 26 or 27. If the marker 28 is displayed on the segment 25 then the observer is provided with a visual display indicating that the graphical objects 20 for the first six radio stations are displayed, if the marker 28 is displayed on the segment 26 then the observer is provided with a visual display indicating that the graphical objects 20 for the second six radio stations are displayed, and if the marker 28 is displayed on the segment 27 then the observer is provided with a visual display indicating that the graphical objects 20 for the third six radio stations are displayed.

The user can alter the displayed subset by means of an operator control process. If the input device comprises a touch-sensitive surface on the display panel 2, for example, then the subset can be altered by a swiping gesture. On the basis of the display shown in FIG. 12, the user can use his fingertip, for example, to touch the strip 21 with the graphical objects 20 and, as shown in FIGS. 13 to 19, can move the fingertip in the direction of arrow B. This movement of the fingertip on the touch-sensitive surface on the display panel 2 is sensed by the control apparatus 3, and the control apparatus 3 then accordingly alters the display reproduced on the display panel 2. The reason is that the movement of the fingertip displaces the graphical objects 20 essentially smoothly in the direction of arrow B. Accordingly, the marker 28 on the strip 24 is displaced smoothly in the opposite direction, with the result that the marker 28 always shows the observer which subsets or which section of the strip 21 with the graphical objects 20 is/are currently displayed.

Instead of moving the finger in the region of the strip 21 in the direction of arrow B, the user could also touch the display panel 2 in the area of the marker 28 and move the fingertip accordingly in the other direction in order to alter the displayed subset with the graphical objects 20 on the strip 21 and at the same time to displace the marker 28 on the strip 24 essentially smoothly.

Following the conclusion of the operator control process, the marker 28 is—in contrast to a conventional scrollbar—automatically moved onto one of the segments 25, 26 or 27 on the basis of the position of the marker 28 relative to the segments 25 to 27 of the strip 24. The marker 28 is moved particularly onto the segment 25, 26 or 27 which provided the greatest coverage upon conclusion of the operator control process. Accordingly, the subset with the graphical objects 20 is displaced such that the first subset is displayed when the marker 28 is on the segment 25, the second subset is displayed when the marker 28 is on the segment 26, and the third subset is displayed when the marker 28 is on the segment 27. When the operator control process is concluded, the marker 28 does not skip to the relevant segment 25, 26 or 27, for example. Instead, an animation, particularly a restrained movement, for the marker 28 to the position is performed. Equally, the positions of the graphical objects 20 are moved until the appropriate subset is displayed.

In the case of the method, the displayable subsets are, therefore, stipulated in advance. They are not freely selectable by means of the operator control process by the user. In the present case, it is not possible to present the graphical objects 20 for radio stations Nos. 3 to 8 simultaneously after the operator control process has concluded, for example.

Instead of a swiping gesture, the user can also tap on a particular segment 25, 26 or 27 of the strip 24 in order to alter the subset. The segments 25 to 27 and also the marker 28 are, therefore, in the form of what are known as buttons which the user can operate by means of the input device.

The extent of the marker 28, i.e. in the present case particularly the length of the marker 28, relative to the extent or length of the segments 25, 26 and 27 is intuitively recognizable to the observer as the number of graphical objects 20 in the currently displayed subset relative to the total number of graphical objects in the set. In order to be able to distinguish the marker 28 from the segments 25 to 27, the marker 28 can be presented in a different color, a different transparency or with a different area fill, for example.

FIGS. 20 to 24 show yet another disclosed embodiment of the method.

Figure 20:
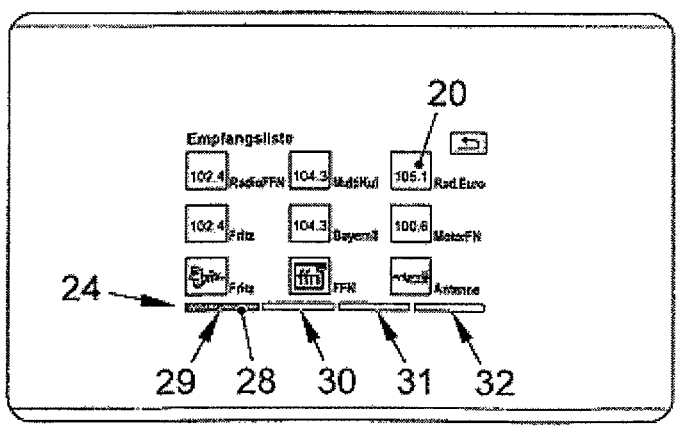
Figure 21:
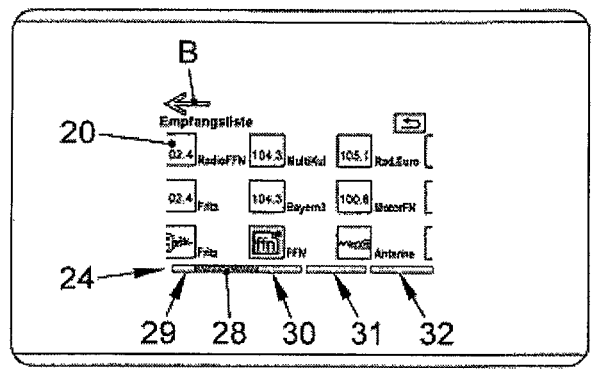
Figure 22:
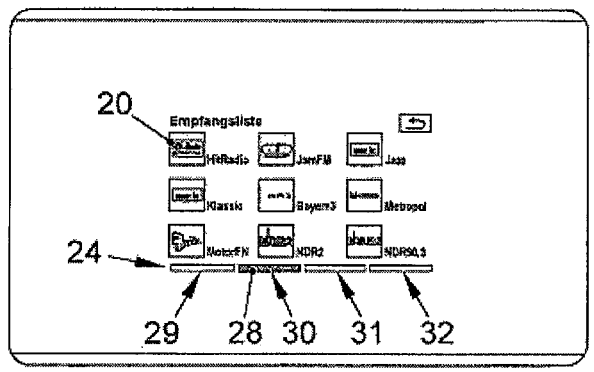
Figure 23:
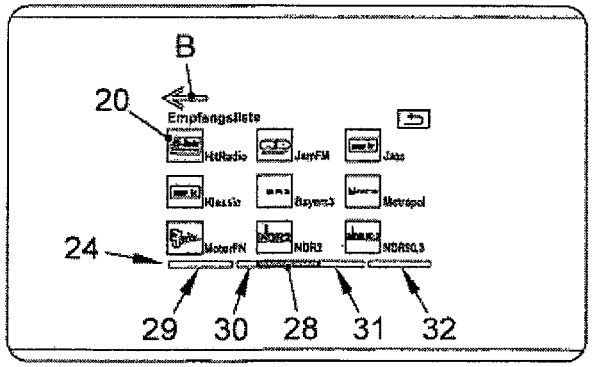
Figure 24:
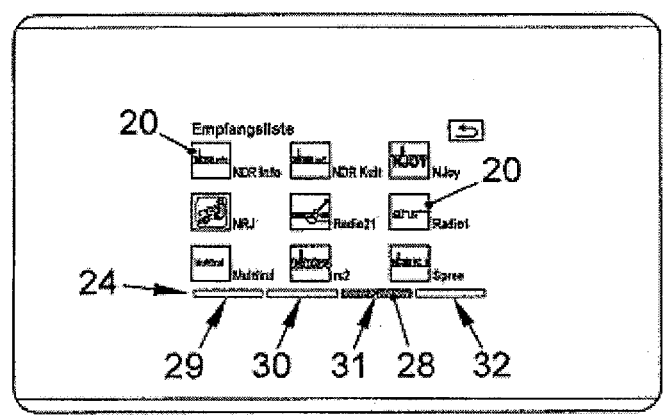

In this example, the graphical objects 20 are displayed not on a linear, one-dimensional strip 21 but rather, as shown in FIG. 20, in a two-dimensional grid. In this case, the total set of graphical objects 20 for the radio stations comprises a total of twenty-seven graphical objects 20. These twenty-seven graphical objects 20 are divided into four subsets with nine graphical objects 20 each. Accordingly, the strip 24 comprises four segments 29 to 32. As explained above, the marker 28 is displayed on the strip 24. As shown in FIGS. 20 to 24, the user can use the input device to displace the displayed subset from the first nine graphical objects 20 for the radio stations to the third nine graphical objects 20 for the radio stations by displacing the marker 28 on the strip 24, for example. As explained above, the marker 28 can be displaced essentially smoothly. Following the conclusion of the operator control process, the marker 28 and accordingly the displayed graphical objects 20 are moved in an animation such that a subset with nine graphical objects 20 that has been stipulated in advance is displayed.

It is pointed out that not only in the first disclosed embodiment of the method but also in the subsequent disclosed embodiments of the method, the speed of the vehicle which is transmitted to the control apparatus 3 by the measuring apparatus 7, can have an influence on the speed of the animations of the graphical objects. In particular, it is possible that animations proceed more quickly at higher vehicle speeds than at low vehicle speeds. The reason is that, in particular, at higher vehicle speeds the driver looks at the display panel 2 without interruption only for a shorter period than at slower vehicle speeds. The effect which can be achieved by this adaptation to suit the vehicle speed is, therefore, that the driver perceives the same path of movement for the animation regardless of the vehicle speed. This makes it easier for the driver to orient himself when the display content alters and to quickly and intuitively grasp the altered information content. The parameters of the animations for the presentation of the information can, therefore, be a disclosed embodiment of the method and the apparatus which can be implemented as an option. When these parameters are determined, particular account is taken of how a driver of a vehicle can grasp information particularly effectively while in transit.

LIST OF REFERENCE SYMBOLS

1 Display device
2 Display panel
3 Control apparatus
4 System clock
5 Memory
6 Data bus
7 Measuring apparatus for the vehicle speed
10 Graphical objects
11 Alphanumeric label
20 Graphical objects
21 Label
22 Display element
23 Display element
24 Strip
25 Segment of the strip 24
26 Segment of the strip 24
27 Segment of the strip 24
28 Marker
29 Segment of the strip 24
30 Segment of the strip 24
31 Segment of the strip 24
32 Segment of the strip 24

The invention claimed is:

1. A method for displaying information in a vehicle cockpit, the method comprising:
controlling display of a display of a menu including a plurality of graphical objects on a display device positioned to be viewed by a driver of the vehicle via a control apparatus so that the display device is in a first or a second display mode;
measuring a speed of the vehicle, and
displaying, in a first speed range, the plurality of graphical objects in the first display mode and displaying, in the second speed range, the same plurality of graphical objects in the second display mode; wherein transition from one to the other display mode prompts the control apparatus to actuate the display device to display the plurality of objects presented in one display mode to move toward one another until the displayed plurality of objects combine in a central area, and subsequently move away from one another in a direction of presentation positions in the other display mode,
wherein the movement of the plurality of graphical objects from the positions for presentation in one display mode toward one another in the direction of the central area is different than the movement of the graphical objects subsequently away from one another in the direction of the positions for presentation in the other display mode.

2. The method of claim 1, wherein the speed ranges are disjunct.

3. The method of claim 2, wherein at least one limit value for at least one of the speed ranges is in the range from 4 km/h to 20 km/h.

4. The method of claim 2, wherein a measured speed that exceeds or drops below at least one limit value for the first or second speed ranges prompts a output of an animation for the transition from one display mode to the other display mode such that driver orientation of a hierarchic display structure of the plurality of graphical objects on the display device is retained.

5. The method of claim 2, wherein transition from one display mode to the other display mode of the first and second display modes is based on a hysteresis in a range from 2 km/h to 5 km/h.

6. The method of claim 5, wherein transition from the first display mode to the second display mode is triggered by a different measured speed than transition from the second display mode to the first display mode.

7. The method of claim 2, wherein the number of the plurality of graphical objects displayed in the first and second display modes is greater than eight.

8. The method of claim 2, wherein transition from one to the other display mode prompts the control apparatus to actuate the display device to display the plurality of objects presented in one display mode to move toward one another until the displayed plurality of objects combine in a central area, and subsequently move away from one another in a direction of presentation positions in the other display mode.

9. The method of claim 8, wherein the movement of the plurality of graphical objects from the positions for presentation in one display mode toward one another in the direction of the central area is different than the movement of the graphical objects subsequently away from one another in the direction of the positions for presentation in the other display mode.

10. The method of claim 1, wherein transition from one display mode to the other display mode of the first and second display modes is based on a hysteresis in a range from 2 km/h to 5 km/h.

11. The method of claim 3, wherein at least one limit value for at least one of the speed ranges is in the range from 4 km/h to 20 km/h.

12. The method of claim 1, wherein the number of the plurality of graphical objects displayed in the first and second display modes is greater than eight.

13. The method of claim 1, wherein the first display mode, the plurality of graphical objects are presented in an arrangement on a virtual ring presented in perspective.

14. The method of claim 13, wherein the second display mode, the plurality of graphical objects are presented beside one another, without overlap in a grid, wherein each graphical object has a fixed position in the grid irrespective of a selection of a graphical object.

15. The method of claim 1, wherein transition from the first display mode to the second display mode is triggered by a different measured speed than transition from the second display mode to the first display mode.

16. The method of claim 1, further comprising transitioning to a presentation of new graphical objects upon selection of a graphical object, wherein a transition movement pattern moves the new graphical objects directionally, conveying that the new graphical objects may further be moved in the same direction in response to interaction with the display.

17. The method of claim 16, wherein the transition movement pattern moves the new graphical objects from right to left conveying that the new graphical objects may further be moved from right to left in response to interaction with the display.

18. The method of claim 17, further comprising moving the new graphical objects from right to left on the display.

19. An apparatus for displaying information in a vehicle cockpit, the apparatus comprising:
- a display device positioned to be viewed by a driver of the vehicle;
- a control apparatus that controls display on the display device, wherein the control apparatus controls display of a menu including a plurality of graphical objects on the display device in a first or a second display mode; and
- a measuring apparatus coupled to the control apparatus and measuring a speed of the vehicle,
- wherein the control apparatus actuates the display device in a first speed range to display the plurality of graphical objects in the first display mode and actuates the display device in a second speed range to display the same plurality of graphical objects in the second display mode; wherein the same plurality of graphical objects are arranged in different positions relative to each other on the display device in the second display mode than relative positions of the same plurality of graphical objects in the first mode; wherein the first display mode, the plurality of graphical objects are presented in an arrangement on a virtual ring presented in perspective,
- wherein the movement of the plurality of graphical objects from the positions for presentation in the first display mode toward one another in the direction of the central area is different than the movement of the graphical objects subsequently away from one another in the direction of the positions for presentation in the second display mode.

20. The apparatus of claim 19, wherein the second display mode, the plurality of graphical objects are presented beside one another, without overlap in a grid, wherein each graphical object has a fixed position in the grid irrespective of a selection of a graphical object.

21. The apparatus of claim 20, wherein at least one limit value for at least one of the speed ranges is in the range from 4 km/h to 20 km/h.

22. The apparatus of claim 19, wherein a measured speed that exceeds or drops below at least one limit value for the first or second speed ranges prompts output of an animation for the transition from one display mode to the other display mode such that driver orientation of a hierarchic display structure of the plurality of graphical objects on the display device is retained.

23. The apparatus of claim 19, wherein transition from one display mode to the other display mode of the first and second display modes involves is based on a hysteresis in a range from 2 km/h to 5 km/h.

24. The apparatus of claim 19, wherein transition from the first display mode to the second display mode is triggered by a different measured speed than transition from the second display mode to the first display mode.

25. The apparatus of claim 19, wherein the number of the plurality of graphical objects displayed in the first and second display modes is greater than eight.

26. The apparatus of claim 19, wherein transition from one to the other display mode prompts the control apparatus to actuate the display device to display the plurality of objects presented in one display mode to move toward one another until the displayed plurality of objects combine in a central area, and subsequently move away from one another in a direction of presentation positions in the other display mode.

27. The apparatus of claim 26, wherein the movement of the plurality of graphical objects from the positions for presentation in one display mode toward one another in the direction of the central area is different than the movement of the graphical objects subsequently away from one another in the direction of the positions for presentation in the other display mode.

28. A vehicle comprising:
- an apparatus for displaying information in a cockpit of the vehicle, the apparatus comprising:
  - a display device positioned to be viewed by a driver of the vehicle;
  - a control apparatus that controls display on the display device, wherein the control apparatus controls display of a menu including a plurality of graphical objects on the display device in a first or a second display mode; and
- a measuring apparatus coupled to the control apparatus and measuring a speed of the vehicle,
- wherein the control apparatus actuates the display device in a first speed range to display the plurality of graphical objects in the first display mode and actuates the display device in a second speed range to display the same plurality of graphical objects in the second display mode; wherein the same plurality of graphical objects are arranged in different positions relative to each other on the display device in the second display mode than relative positions of the same plurality of graphical objects in the first mode,
- wherein the movement of the plurality of graphical objects from the positions for presentation in the first display mode toward one another in the direction of the central area is different than the movement of the graphical objects subsequently away from one another in the direction of the positions for presentation in the second display mode.

29. The vehicle of claim 28, wherein transition from the first display mode to the second display mode is triggered by a different measured speed than transition from the second display mode to the first display mode.

\* \* \* \* \*